(12) United States Patent
Zhou et al.

(10) Patent No.: US 9,232,531 B2
(45) Date of Patent: Jan. 5, 2016

(54) PRIORITIZATION OF USERS FOR SWITCHING BETWEEN CO-EXISTENCE WIRELESS SYSTEMS

(71) Applicant: QUALCOMM Incorporated, San Diego, CA (US)

(72) Inventors: Yan Zhou, San Diego, CA (US); Andrei Dragos Radulescu, San Diego, CA (US); Peerapol Tinnakornsrisuphap, San Diego, CA (US); Jay Kumar Sundararajan, San Diego, CA (US); Arnaud Meylan, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/779,270

(22) Filed: Feb. 27, 2013

(65) Prior Publication Data

US 2014/0112306 A1    Apr. 24, 2014

Related U.S. Application Data

(60) Provisional application No. 61/716,999, filed on Oct. 22, 2012.

(51) Int. Cl.
  H04W 72/10    (2009.01)
  H04L 12/759    (2013.01)
  H04W 36/14    (2009.01)
  (Continued)

(52) U.S. Cl.
  CPC ............ *H04W 72/10* (2013.01); *H04L 45/028* (2013.01); *H04W 36/00* (2013.01); *H04W 36/0022* (2013.01); *H04W 36/14* (2013.01); *H04W 36/22* (2013.01); *H04W 36/24* (2013.01); *H04W 48/06* (2013.01); *H04W 48/18* (2013.01); *H04W 36/0066* (2013.01)

(58) Field of Classification Search
  None
  See application file for complete search history.

(56) References Cited

U.S. PATENT DOCUMENTS 7,457,621 B2    11/2008    Zhang
7,949,812 B1    5/2011    Wong et al.
(Continued)

FOREIGN PATENT DOCUMENTS

EP    1227695 A1    7/2002
EP    1983789 A1    10/2008
(Continued)

OTHER PUBLICATIONS

International Search Report and Written Opinion—PCT/US2013/066206—ISA/EPO—Mar. 6, 2014.
(Continued)

*Primary Examiner* — Kerri Rose

(57) ABSTRACT

Techniques for prioritizing user equipments (UEs) for switching between wireless systems are disclosed. The wireless systems may be part of a small cell and may include a WLAN system and a cellular system. In one design, a network entity (e.g., the small cell) may identify a plurality of UEs communicating with a first wireless system. The first wireless system may be one of a plurality of wireless systems providing communication coverage for the UEs. The network entity may determine priorities of the UEs for switching from the first wireless system to a second wireless system. The network entity may then select at least one UE among the plurality of UEs to switch from the first wireless system to the second wireless system based on the priorities of the UEs.

32 Claims, 4 Drawing Sheets

(51) Int. Cl.
*H04W 48/18* (2009.01)
*H04W 36/24* (2009.01)
*H04W 36/00* (2009.01)
*H04W 36/22* (2009.01)
*H04W 48/06* (2009.01)

(56) References Cited

U.S. PATENT DOCUMENTS

| | | |
|---|---|---|
| 8,200,232 B2 | 6/2012 | Lee et al. |
| 8,249,505 B1 | 8/2012 | Goldner et al. |
| 8,504,055 B2 | 8/2013 | Vikberg et al. |
| 2001/0012778 A1 | 8/2001 | Eriksson et al. |
| 2004/0180660 A1 | 9/2004 | Choi et al. |
| 2005/0066033 A1 | 3/2005 | Cheston et al. |
| 2005/0070287 A1 | 3/2005 | Cave et al. |
| 2005/0094560 A1 | 5/2005 | Montes Linares |
| 2006/0121901 A1 | 6/2006 | Tanaka et al. |
| 2007/0280161 A1 | 12/2007 | Rudrapatna et al. |
| 2008/0014957 A1 | 1/2008 | Ore |
| 2008/0170497 A1 | 7/2008 | Jeong et al. |
| 2008/0254797 A1 | 10/2008 | Achtari et al. |
| 2009/0046665 A1* | 2/2009 | Robson et al. ............. 370/332 |
| 2009/0088131 A1 | 4/2009 | Gholmieh et al. |
| 2009/0175454 A1 | 7/2009 | Watanabe et al. |
| 2009/0203375 A1 | 8/2009 | Gisby et al. |
| 2009/0232088 A1 | 9/2009 | Wisely |
| 2009/0318144 A1 | 12/2009 | Thomas et al. |
| 2010/0128696 A1 | 5/2010 | Fantini et al. |
| 2010/0220687 A1 | 9/2010 | Reznik et al. |
| 2010/0227591 A1 | 9/2010 | Park et al. |
| 2010/0240386 A1 | 9/2010 | Hamabe et al. |
| 2010/0281519 A1 | 11/2010 | Das et al. |
| 2011/0013559 A1 | 1/2011 | Marin |
| 2011/0039562 A1 | 2/2011 | Balasubramanian et al. |
| 2011/0093913 A1 | 4/2011 | Wohlert et al. |
| 2011/0110520 A1 | 5/2011 | Ness et al. |
| 2011/0176511 A1 | 7/2011 | Sayeedi |
| 2011/0195714 A1 | 8/2011 | Sawinathan |
| 2011/0244866 A1 | 10/2011 | Yamamoto et al. |
| 2011/0263250 A1 | 10/2011 | Mueck et al. |
| 2011/0312365 A1 | 12/2011 | Hatano et al. |
| 2011/0320588 A1 | 12/2011 | Raleigh |
| 2012/0014345 A1 | 1/2012 | Faurie et al. |
| 2012/0026865 A1 | 2/2012 | Fan et al. |
| 2012/0033658 A1 | 2/2012 | Ganesan |
| 2012/0044804 A1 | 2/2012 | Rahman et al. |
| 2012/0044897 A1 | 2/2012 | Wager et al. |
| 2012/0100861 A1 | 4/2012 | Zhang et al. |
| 2012/0122458 A1 | 5/2012 | Jokinen et al. |
| 2012/0149351 A1 | 6/2012 | Kalbag |
| 2012/0178467 A1 | 7/2012 | Fujii et al. |
| 2012/0196644 A1 | 8/2012 | Scherzer et al. |
| 2013/0003590 A1 | 1/2013 | Gage et al. |
| 2013/0016700 A1 | 1/2013 | Yu et al. |
| 2014/0004862 A1* | 1/2014 | Ekemark ............. 455/443 |
| 2014/0044003 A1 | 2/2014 | Drazynski et al. |
| 2014/0071967 A1 | 3/2014 | Velasco |
| 2014/0073317 A1 | 3/2014 | Zhou et al. |
| 2014/0112169 A1 | 4/2014 | Zhou |
| 2014/0112170 A1 | 4/2014 | Zhou |
| 2014/0113590 A1 | 4/2014 | Meylan |
| 2014/0113631 A1 | 4/2014 | Zhou |

FOREIGN PATENT DOCUMENTS

| | | |
|---|---|---|
| EP | 2312902 A1 | 4/2011 |
| EP | 2437546 A1 | 4/2012 |
| EP | 2571311 A1 | 3/2013 |
| WO | 2005101889 A1 | 10/2005 |
| WO | 2006075937 A1 | 7/2006 |
| WO | 2009000696 A1 | 12/2008 |
| WO | 2009152738 A1 | 12/2009 |
| WO | 2010068155 A1 | 6/2010 |
| WO | 2010080056 A1 | 7/2010 |
| WO | 2011054089 A1 | 5/2011 |
| WO | 2011107886 A1 | 9/2011 |
| WO | 2012121757 A1 | 9/2012 |

OTHER PUBLICATIONS

Shrestha G., et al., "A Method to Estimate the Reliability of Expert Judgement", Session 10C2, IEEE Proceedings-1989 Southeastcon, pp. 152-157.

* cited by examiner

PRIORITIZATION OF USERS FOR SWITCHING BETWEEN CO-EXISTENCE WIRELESS SYSTEMS

The present application claims priority to provisional U.S. Application Ser. No. 61/716,999, entitled "METHOD AND APPARATUS FOR SUPPORTING WIRELESS COMMUNICATION VIA A SMALL CELL," filed Oct. 22, 2012, and incorporated herein by reference in its entirety.

BACKGROUND

I. Field

The present disclosure relates generally to communication, and more specifically to techniques for supporting wireless communication.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless system may include one or more base stations that can support communication for one or more user equipments (UEs). A UE may communicate with a base station via the downlink and uplink. The downlink (or forward link) refers to the communication link from the base station to the UE, and the uplink (or reverse link) refers to the communication link from the UE to the base station.

Multiple wireless systems utilizing different radio technologies may be deployed in a given geographic area. Any number of UEs may be located with the geographic area. Each UE may support one or more of the radio technologies utilized by the multiple wireless systems. It may be desirable to efficiently support communication for the UEs via the multiple wireless systems.

SUMMARY

Techniques for prioritizing UEs for switching between wireless systems are disclosed herein. The techniques may be used for wireless systems deployed in various manners and may be especially applicable for wireless systems in a small cell. A small cell may include an access point for a wireless local area network (WLAN) system and a femto cell for a cellular system. The small cell may perform certain control functions such as (i) switching UEs between wireless systems in the small cell and (ii) possibly switching UEs between the wireless systems in the small cell and other wireless systems external to the small cell.

In an aspect of the present disclosure, UEs communicating with a wireless system that is congested may be prioritized for switching to another wireless system that is not congested. One or more UEs may then be selected, based on their priorities, for switching to the uncongested wireless system.

In one design, a network entity (e.g., a small cell) may identify a plurality of UEs communicating with a first wireless system. The first wireless system may be one of a plurality of wireless systems providing communication coverage for the UEs. The network entity may determine priorities of the UEs for switching from the first wireless system to a second wireless system. For example, the network entity may determine the priority of each UE based on one or more factors such as (i) whether the UE can receive service on the second wireless system, (ii) whether the UE has an active application that is supported on only the first wireless system, (iii) an amount of resources of the first wireless system utilized by the UE, (iv) a transmit buffer size and/or a receive buffer size of the UE, (v) whether the UE has an active real-time application, (vi) service charge to the UE for the first and/or second wireless system, (vii) capability of the UE on the second wireless system, (viii) whether the UE has traffic on the downlink and/or uplink, (ix) data requirements of the UE, (x) data performance of the UE on the first wireless system, (xi) channel quality of the UE for the first and/or second wireless system, and/or (xii) other factors. The network entity may select at least one UE among the plurality of UEs to switch from the first wireless system to the second wireless system based on the priorities of the UEs.

Various aspects and features of the disclosure are described in further detail below.

DETAILED DESCRIPTION

The techniques described herein may be used for various wireless communication systems such as CDMA, TDMA, FDMA, OFDMA, SC-FDMA and other wireless systems. The terms "system" and "network" are often used interchangeably. A CDMA system may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless systems and radio technologies mentioned above as well as other wireless systems and radio technologies.

Figure 1:
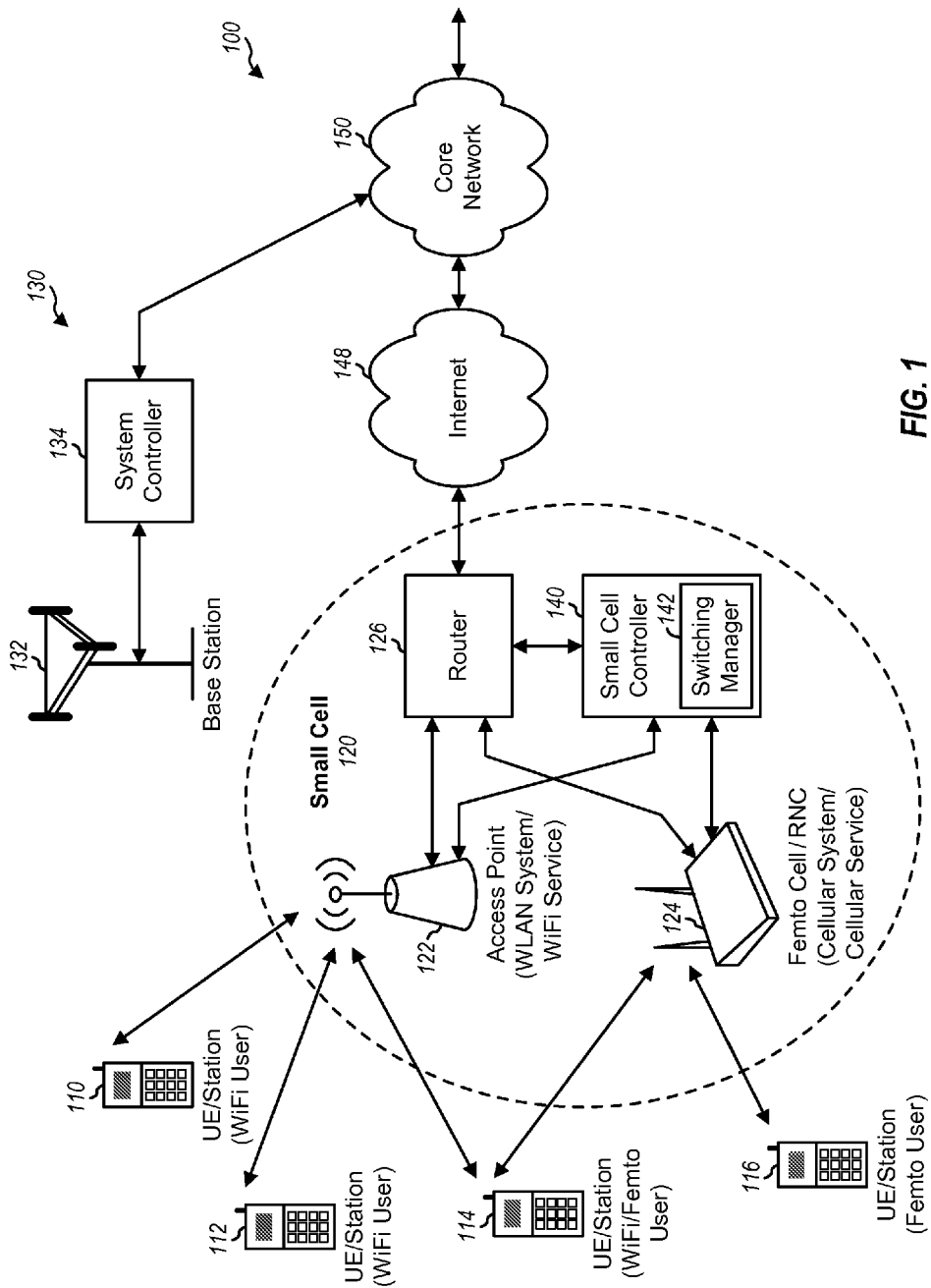
FIG. 1 shows an exemplary system deployment.

FIG. 1 shows an exemplary system deployment 100 in which various aspects of the present disclosure may be implemented. A small cell 120 may support communication for a small geographic area such as a home, an apartment, an office, a shop, etc. Small cell 120 may include an access point (AP)

122 supporting communication via a first radio technology and a femto cell 124 supporting communication via a second radio technology. Access point 122 may be part of a WLAN system providing WiFi service, and femto cell 124 may be part of a cellular system providing cellular service. A WLAN system is a wireless system supporting communication for a small geographic area, e.g., a home, an office, etc. A cellular system is a wireless system supporting communication for a large geographic area, e.g., a city, a state, a country, etc. Small cell 120 may thus support communication for multiple co-existence wireless systems, which are wireless systems with overlapping coverage and under the control of a common network entity. A network entity may be any entity that is not a UE and may also be referred to as a wireless node, etc.

Access point 122 may support a radio technology such as WiFi, Hiperlan, or some other WLAN radio technology. Access point 122 may support communication for a basic service set (BSS), which includes a set of stations that can communicate with each other. The BSS may also be referred to as a WLAN system.

Femto cell 124 may support a radio technology such as LTE, WCDMA, CDMA 1X, GSM, etc. Femto cell 124 may also be referred to as a home base station (HBS), a home access point (HAP), a home Node B (HNB), a home evolved Node B (HeNB), etc. Femto cell 124 may be configured to provide restricted access for a group of UEs, which may belong in a closed subscriber group (CSG). Femto cell 124 may allow a network operator to extend the coverage of a cellular system, to increase capacity, and/or to obtain other advantages. Femto cell 124 may be considered as part of the cellular system and may communicate with other network entities in the cellular system. Femto cell 124 may operate as described in 3GPP TR 25.820, entitled "3G Home NodeB Study Item Technical Report," which is publicly available. Femto cell 124 may also operate as described in documents for other radio technologies. Femto cell 124 may include a radio network controller (RNC), which may perform some functions normally performed by an RNC in a cellular system.

Access point 122 and femto cell 124 may be coupled to a router 126, which may be coupled to the Internet 148 or some other data network. Router 126 may route traffic data between access point 122 and femto cell 124 and other entities. Access point 122 and femto cell 124 may further be coupled to a small cell controller 140, which may perform coordination and control functions for these entities. Small cell controller 140 may include various modules to perform coordination and control functions, such as a switching manager 142 that can control (i) switching of UEs between the WLAN system and the cellular system in small cell 120 and (ii) switching of UEs from the WLAN system or the cellular system to a wireless system external to small cell 120. Small cell controller 140 may communicate with entities in a core network 150, which may include various network entities supporting communication and other services for UEs.

In an exemplary design, small cell 120 may be a physical hardware module or unit (e.g., a commercially available product), which may be purchased by a user and installed in a home, an apartment, etc. The hardware module for small cell 120 may include a first module (e.g., an integrated circuit (IC) chip or a circuit board) for access point 122, a second module for femto cell 124, a third module for router 126, and a fourth module for small cell controller 140. The fourth module for small cell controller 140 may include a memory storing various software modules, one of which may be switching manager 142. In general, small cell 120 may include any number of hardware modules. Each hardware module may perform any set of functions and may support access point 122, or femto cell 124, or router 126, or small cell controller 140, or a combination thereof. The functions of each of access point 122, femto cell 124, router 126, and small cell controller 140 may be implemented in software and/or hardware on one or more hardware modules of small cell 120.

A base station 132 may support communication for a relatively large geographic area, e.g., up to 10 kilometer (Km) in radius. A coverage area of base station 132 and/or a base station subsystem serving this coverage area may be referred to as a macro cell. Base station 132 may be part of a cellular system 130, which may include other base stations not shown in FIG. 1 for simplicity. Cellular system 130 may support the same radio technology as femto cell 124 or a different radio technology. Base station 132 may couple to a system controller 134, which may provide coordination and control for base station 132 and other base stations. System controller 134 may further couple to core network 150.

UEs 110 to 116 may be dispersed throughout the coverage area of small cell 120, and each UE may be stationary or mobile. A UE may also be referred to as a mobile station, a terminal, an access terminal, a subscriber unit, a station (STA), etc. A UE may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc. A UE may be able to communicate with access point 122 and/or femto cell 124 in small cell 120. A UE may also be able to communicate with base station 132 in cellular system 130. A UE may be referred to as a station (e.g., when communicating with access point 122), a user, etc.

As shown in FIG. 1, small cell 120 may include co-located access point 122 providing WLAN service and femto cell 124 providing cellular service. Any number of UEs (i.e., stations or users) may be located within the coverage of small cell 120. Each UE may support only WLAN service, or only cellular service, or both WLAN and cellular services. Any number of UEs in small cell 120 may be active at any given moment. The active UEs may have different capabilities and/or data requirements. The active UEs may also observe different channel conditions for access point 122 and femto cell 124.

The WLAN system and/or the cellular system in small cell 120 may be congested. Congestion in the cellular system may be quantified based on various metrics such as transmit power on the downlink, received signal strength indicator (RSSI) on the uplink, available resource blocks for each of the downlink and uplink, available orthogonal codes for each of the downlink and uplink, available channel elements in a femto cell, etc. Congestion and resource usage may also be quantified based on other metrics related to radio resources, hardware resources, and/or backhaul resources in the cellular system. Congestion in the WLAN system may be quantified based on various metrics such as wireless medium utilization, etc. Stations in the WLAN system may be time division multiplexed on a wireless medium, and only one station may transmit on the wireless medium at any given moment in order to avoid collisions between stations. Stations may contend for access to the wireless medium or may be scheduled for transmission on the wireless medium. Wireless medium utilization may be given by a percentage of time that the wireless medium is used by stations in the WLAN system in a predetermined time interval (e.g., a beacon interval of approximately 100 milliseconds).

The WLAN system in small cell 120 may serve any number of UEs, and the cellular system in small cell 120 may also serve any number of UEs. Any number of UEs may be within the coverage of each wireless system in small cell 120. Each UE may have certain data requirements, which may be dependent on active applications running in the UE. Each UE may also have certain capabilities with respect to the WLAN system and the cellular system in small cell 120.

In an aspect of the present disclosure, techniques for prioritizing UEs for switching between different wireless systems are disclosed. A WLAN system and/or a cellular system in a small cell may be congested due to various reasons. When this occurs, one or more UEs in a congested wireless system in the small cell may be switched to an uncongested wireless system in order to mitigate congestion and improve performance of the affected UEs and wireless systems. One or more UEs in the congested wireless system may also be switched to an external wireless system (e.g., a macro cell) outside of the small cell, for example, if all wireless systems in the small cell are congested. UEs served by the congested wireless system may be prioritized for switching to the uncongested wireless system. The UEs may then be switched based on their priorities, which may be used to determine which UEs to switch between wireless systems.

UEs may be prioritized for switching between wireless systems based on one or more of the following goals:
G1. Improved performance for switched UEs in new system,
G2. Acceptable performance degradation observed by UEs due to switching,
G3. Acceptable impact to existing UEs in the new system due to switched UEs, and
G4. Other goals.

UEs may be prioritized for switching between wireless systems in order to achieve the above-mentioned goals and/or other goals when either the WLAN system or the cellular system in the small cell is congested. UEs may be prioritized based on the following general guideline:
A1. Switched UEs should have service on new system and should not have active applications that are only supported on current serving system,
A2. UEs with greater desire for better performance should be assigned higher priority for switching,
A3. UEs with applications that are more tolerant to performance degradation due to switching may be assigned higher priority for switching,
A4. UEs with higher efficiency in new system and/or lower efficiency in current serving system may be assigned higher priority for switching, and
A5. Other considerations.

In general, a given UE X may be prioritized for switching from a serving system to a new system based on any factor and any number of factors. In one design, UE X may be assigned a priority for switching to the new system based on one or more of the following factors:
B1. Whether the UE can receive service on the new system,
B2. Whether the UE has active application supported on only the serving system,
B3. Amount of resources of the serving system utilized by the UE,
B4. Transmit buffer size of the UE,
B5. Receive buffer size of the UE,
B6. Nature of active applications in the UE (e.g., real-time or non real-time),
B7. Service charge to the UE on the serving system and/or new system,
B8. Capability/efficiency of the UE on the serving system,
B9. Capability/efficiency of the UE on the new system,
B10. Direction of traffic of the UE (e.g., downlink and/or uplink),
B11. Amount of traffic in each direction for the UE,
B12. Data requirements of the UE,
B13. Data performance of the UE on the serving system,
B14. Channel conditions for the serving system and/or new system, and
B15. Other factors.

Factor B1 may ensure that UE X will be switched to the new system only if UE X can receive service on the new system. UE X may be assigned a higher priority for switching to the new system if it can receive service on the new system. Factor B2 may ensure that an active application running in UE X can be supported on the new system. UE X may be assigned a lower priority for switching to the new system if it has an active application that is supported on only the serving system.

Factor B3 may be considered in order to relieve congestion in the serving system. UE X may be assigned a higher priority for switching to the new system if it utilizes more resources of the serving system. This may alleviate congestion in the serving system.

Factor B4 may be indicative of an amount of data to transmit by UE X on the uplink. Factor B5 may also include an amount of data to transmit to UE X on the downlink. UE X may benefit more from switching to the new system if it has more data to transmit and/or receive and may then be assigned a higher priority for switching. Factor B5 may be indicative of an amount of data buffered by UE X. UE X may observe less adverse effects due to switching if it has more buffered data, e.g., because an application in UE X can play the buffered data and can better tolerate switching delay. Factor B6 may be indicative of tolerant to performance degradation due to switching. Real-time applications may be less tolerant to switching delay than non-real time applications. UE X may be assigned a higher priority for switching if it has more buffered data and/or has no active real-time applications.

Factor B7 may be indicative of the desire to switch to the new system. If UE X is roaming in the serving system and not in the new system, then it may be desirable to switch to the new system in order to reduce cost. Conversely, if UE X is not roaming in the serving system but would be roaming in the new system, then it may be desirable to switch to the new system only if the benefit of switching outweighs the higher cost. UE X may be assigned a higher priority for switching if it is roaming in the serving system and/or is not roaming in the new system.

Factors B8 and B9 may be indicative of the benefit of switching UE X to the new system. If UE X has greater capability/efficiency on the new system, then greater benefits may be obtained from switching, and UE X may be assigned a higher priority for switching. Conversely, if UE X has lower capability/efficiency on the new system, then less benefits may be obtained from switching, and UE X may be assigned a lower priority for switching.

Factors B10 and B11 may be indicative of impact to the new system due to switching UE X to the new system. Traffic on the downlink may cause less interference and less collisions than traffic on the uplink. Hence UEs with large traffic on the downlink may be considered first for switching.

Factors B12 and B13 may be indicative of user satisfaction. The data requirements of UE X may be dependent on which applications are active on UE X. The data performance of UE X on the serving system may be quantified based on various metrics such as throughput, data latency/delay, peak data rate, guaranteed bit rate, transmit buffer size, happy bits, etc. The data performance of UE X may be compared against the data requirements of UE X to ensure that UE X is provided with good service.

UE X may be assigned a priority for switching between systems based on any of the factors described above. UE X may be assigned a switching priority by taking into account the capability and requirements of UE X, the capability of the new system to serve UE X, the performance of UE X on the serving system and new system, and/or other attributes of UE X with regard to the serving system and/or the new system. The switching priority of UE X may also be determined by taking into account the capabilities of various systems to serve UE X.

UE X may also be switched to a macro cell if appropriate, e.g., if the WLAN system and the cellular system are both congested or are incapable of adequately supporting communication for UE X.

Some or all of the factors described above may be applicable for a given wireless system. In particular, some factors may be applicable for both the WLAN system and the cellular system in the small cell, some factors may be applicable for only the WLAN system, and some factors may be applicable for only the cellular system. Furthermore, a given factor may be defined in different manners for different wireless systems. For example, different wireless systems may be associated with resources of different types. Hence, congestion may be defined in different manners for different wireless systems.

UEs may be switched from the cellular system to the WLAN system in the small cell if the cellular system is congested and the WLAN system is not congested. In one design, UEs may be prioritized for switching from the cellular system to the WLAN system based on one or more of the following factors:

C1. Femto UEs with WiFi service may have higher priority for switching to WLAN system than femto UEs without WiFi service, C2. Femto UEs with active applications supported on only cellular system may have lower priority for switching to WLAN system than femto UEs without such applications, C3. Femto UEs with greater resource usage on cellular system may have higher priority for switching to WLAN system than femto UEs with less resource usage on cellular system, C4. Femto UEs with larger transmit buffer size may have higher priority for switching to WLAN system than femto UEs with smaller transmit buffer size, C5. Femto UEs with larger receive buffer size may have higher priority for switching to WLAN system than femto UEs with smaller receive buffer size, C6. Femto UEs with real-time applications may have lower priority for switching to WLAN system than femto UEs without real-time applications, C7. Femto UEs with higher cellular service charge/usage (e.g., femto UEs in cellular roaming) may have higher priority for switching to WLAN system than femto UEs with lower cellular service charge/usage, C8. Femto UEs with higher WiFi capability/efficiency may have higher priority for switching to WLAN system than femto UEs with lower WiFi capability/efficiency, C9. Femto UEs with downlink traffic may have higher priority for switching to WLAN system than femto UEs with uplink traffic, e.g., downlink traffic may cause less collisions in WLAN system than uplink traffic, and C10. Other factors.

For factor C3, resource usage may be quantified based on various metrics such as transmit power on the downlink, RSSI on the uplink, available resource blocks for each of the downlink and uplink, available orthogonal codes for each of the downlink and uplink, available channel elements in a femto cell, etc. Resource usage may also be quantified based on other metrics related to radio resources, hardware resources, and/or backhaul resources in the cellular system.

For factor C8, WiFi capability may be quantified based on various metrics such as physical layer rate, goodput, supported security protocols, supported bandwidths, supported operating modes, etc. Goodput may refer to the percentage of packets decoded correctly (i.e., good packets) to transmitted packets.

The WLAN system and UE X may each support one or more standards in the 802.11 family of standards for WiFi. Each 802.11 standard supports a set of data rates, one or more system bandwidths, and one or more modulation techniques. For example, legacy 802.11 supports up to 2 megabits/second (Mbps) on 20 MHz system bandwidth with direct-sequence spread spectrum (DSSS) or frequency-hopping spread spectrum (FHSS). 802.11a supports up to 54 Mbps on 20 MHz with orthogonal frequency division multiplexing (OFDM). 802.11b supports up to 11 Mbps on 20 MHz with DSSS. 802.11g supports up to 54 Mbps on 20 MHz with OFDM and DSSS. 802.11n supports up to 150 Mbps on 20 or 40 MHz with OFDM. 802.11ac supports up to 867 Mbps on up to 160 MHz with OFDM.

The WLAN system and UE X may each support one or more security protocols such as Wired Equivalent Privacy (WEP), Wi-Fi Protected Access (WPA), and WPA version 2 (WPAv2). WEP is the original security protocol for WLAN and is the least secure. WPA is an improved security protocol for WLAN, and WPA2 is an enhanced security protocol over WPA. Each security protocol may support one or more authentication and/or encryption methods.

Low WiFi capability of UE X in the WLAN system may be quantified by a low physical layer rate (e.g., for 802.11b), a low goodput, an outdated security protocol (e.g., WEP and/or WPA), inability to support 40 MHz operation (e.g., only support 20 MHz operation), no support of green-field format and reduced inter-frame spacing (IFS) (e.g., only support low-efficiency operation by an access point), etc.

Femto UEs with higher priority may be switched to the WLAN system earlier than femto UEs with lower priority. Conversely, femto UEs with lower priority may be switched to the WLAN system later than femto UEs with higher priority.

UEs may be switched from the WLAN system to the cellular system in the small cell if the WLAN system is congested and the cellular system is not congested. In one design, UEs may be prioritized for switching from the WLAN system to the cellular system based on one or more of the following factors:

D1. WiFi UEs with cellular service may have higher priority for switching to cellular system than WiFi UEs without cellular service, D2. WiFi UEs with active applications supported on only WLAN system may have lower priority for switching to cellular system than UEs without such applications, D3. WiFi UEs with higher resource usage on WLAN system may have higher priority for switching to cellular system than UEs with lower resource usage, D4. WiFi UEs with larger transmit buffer size may have higher priority for switching to cellular system than WiFi UEs with smaller transmit buffer size, D5. WiFi UEs with larger receive buffer size may have higher priority for switching to cellular system than WiFi UEs with smaller receive buffer size, D6. WiFi UEs with real-time applications may have lower priority for switching to cellular system than WiFi UEs without real-time applications, D7. WiFi UEs with lower cellular service charge/usage may have higher priority for switching to cellular system than WiFi UEs with higher cellular charge/usage, D8. WiFi UEs with higher cellular capability/efficiency may have higher priority for switching to cellular system than WiFi UEs with lower cellular capability/efficiency, D9. WiFi UEs with uplink traffic may have higher priority for switching to cellular system than WiFi UEs with downlink traffic, and D10. Other factors.

In general, UEs may be switched between wireless systems in the small cell based on any of the factors described above. One or more UEs may be considered for switching between wireless systems at any given moment. If multiple UEs are considered for switching, then these UEs may be prioritized and selected for switching based on their priorities.

UEs may be prioritized for switching between wireless systems based on one or more factors, which may include any of the factors described above and/or other factors. The UEs may be prioritized based on one or more factors in various manners.

In a first design, the factors may be considered separately for prioritizing UEs for switching between wireless systems, e.g., one factor at a time. The factors may be arranged in an order of importance. For example, in one design, factors B1 to B10 may be listed in order of importance, with factor B1 being the most important and factor B10 being the least importance. The factors may also be arranged in some other order of importance. UEs may be prioritized for switching by considering one factor at a time, starting with the most important factor (e.g., factor B1, C1 or D1). For the factor being considered, UEs may be prioritized based on information or metrics related to the factor and may then be selected for switching based on the priorities of the UEs. If UEs cannot be differentiated based on the factor being considered, then the next most important factor may be considered for prioritizing UEs. The process may be repeated until all factors have been considered or a termination condition is encountered (e.g., no more UEs left to switch).

In a second design, the factors may be jointly considered for prioritizing UEs for switching between wireless systems. In this design, UEs may be prioritized for switching by considering all of the factors together. For example, UEs may be assigned priorities for switching based on metrics determined by a function of all factors being considered and may then be selected for switching based on the priorities of the UEs.

In a third design, the factors may be arranged into groups, and one group of factors may be considered for prioritizing UEs for switching at a time. Each group may include one or more factors. For example, a first group of factors may include discrete yes/no factors related to the new system, such as whether a UE can receive service on the new system, whether the UE has active applications that cannot supported on the new system, etc. A second group of factors may include factors related to capabilities and requirements of UEs, such as resource usage on the serving system, buffer size, types of active application, etc. The groups of factors may be arranged in order of importance. For example, the first group of factors may be deemed the most important, and the second group of factors may be deemed less important. The groups of factors may also be assigned importance in some other order. UEs may be prioritized for switching between wireless systems by considering one group of factors at a time, starting with the most important group of factors. For the group of factors being considered, the UEs may be prioritized based on this group of factors and may then be selected for switching based on the priorities of the UEs. The process may be repeated until all groups of factors have been considered or a termination condition is encountered. A metric may be defined for a UE for each group of factors based on a function of the factors in the group. For example, a first metric may be defined for the first group of factors, a second metric may be defined for the second group of factors, etc. The metrics may be used to assign a priority to the UE.

In one design, UEs may be prioritized for switching in each direction separately (e.g., from the WLAN system to the cellular system and from the cellular system to the WLAN system). In this design, UEs may be prioritized for switching from the WLAN system to the cellular system based on one or more factors applicable for switching UEs in this direction. UEs may be prioritized for switching from the cellular system to the WLAN system based on one or more factors applicable for switching UEs in this direction. In another design, UEs may be prioritized for switching in both directions. In this design, a UE may be assigned a priority for switching from the WLAN system to the cellular system, and the assigned priority may also be applicable for switching from the cellular system to the WLAN system. This design may be especially applicable when the WLAN system and the cellular system are both congested.

UEs may be prioritized for switching between wireless systems, e.g., as described above. In one design, one UE may be selected for switching between wireless systems at a time based on the priorities of the UEs. The congestion status of the wireless systems may be updated after switching the selected UE. The process may be repeated, and another UE may be selected for switching between wireless systems. In another design, multiple UEs with higher priority than other UEs may be simultaneously switched between wireless systems in order to speed up relief of congestion.

In one design, switching manager 142 within small cell controller 140 in FIG. 1 may control switching of UEs between wireless systems in small cell 120. Switching manager 142 may also control switching of UEs in wireless systems in small cell 120 to a wireless system external to small cell 120. Switching manager 142 may prioritized UEs communicating with the WLAN system and/or the cellular system in small cell 120 and may switch UEs between wireless systems based on the priorities of the UEs.

Figures 2, 3:
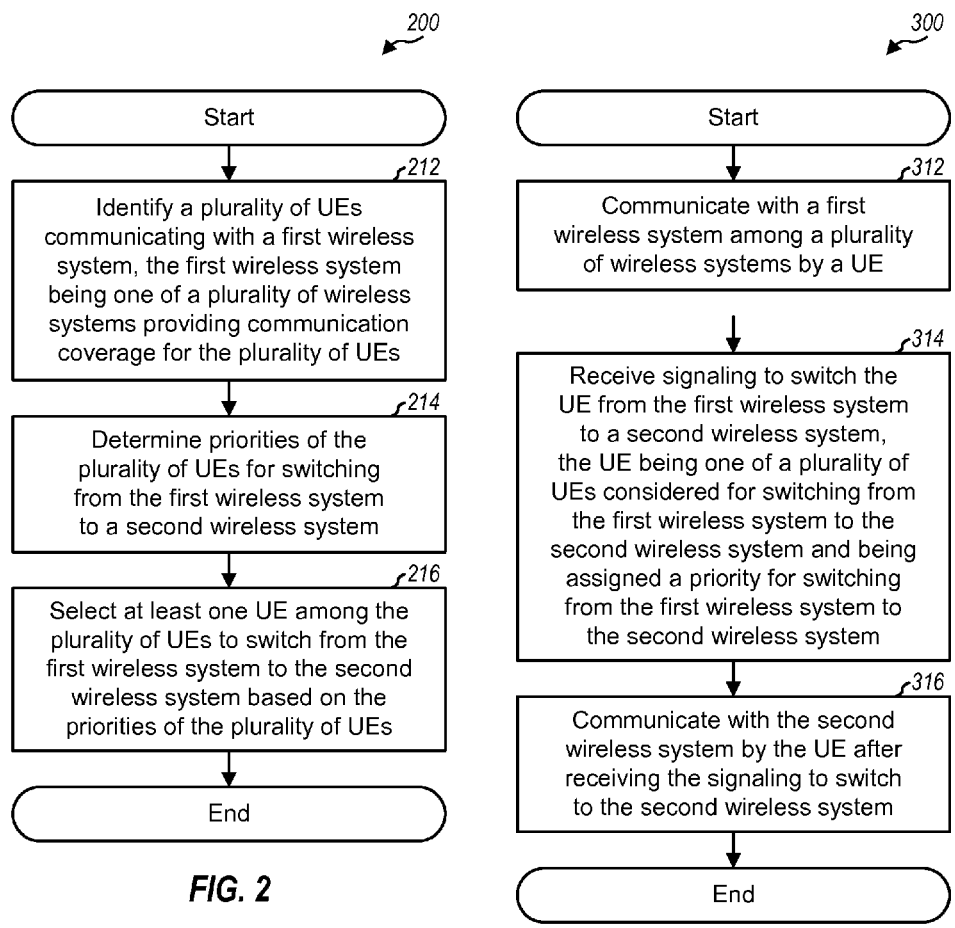
FIG. 2 shows a process for prioritizing UEs for switching between wireless systems.
FIG. 3 shows a process for communicating by a UE.

FIG. 2 shows a design of a process 200 for prioritizing UEs for switching between wireless systems. Process 200 may be performed by a network entity (e.g., switching manager 142 or small cell controller 140 in FIG. 1) or by some other entity. The network entity may identify a plurality of UEs communicating with a first wireless system (block 212). The first wireless system may experience congestion, or may anticipate congestion due to a known resource usage pattern, or may desire to perform load balancing. The first wireless system may be one of a plurality of wireless systems providing communication coverage for the plurality of UEs, i.e., the plurality of UEs are under the coverage of the plurality of wireless systems. The network entity may determine priorities of the plurality of UEs for switching from the first wireless system to a second wireless system (block 214). The network entity may select at least one UE among the plurality of UEs to switch from the first wireless system to the second wireless system based on the priorities of the plurality of UEs (block 216).

For block 214, the network entity may determine a priority of each UE for switching from the first wireless system to the second wireless system based on one or more factors such as (i) whether the UE can receive service on the second wireless system, (ii) whether the UE has an active application that is supported on only the first wireless system, (iii) an amount of resources of the first wireless system utilized by the UE, (iv) a transmit buffer size and/or a receive buffer size of the UE, (v) whether the UE has an active real-time application, (vi) service charge to the UE for the first and/or second wireless system, (vii) capability/efficiency of the UE on the first and/or second wireless system, (viii) whether the UE has traffic on downlink and/or uplink, (ix) data requirements of the UE, (x) data performance of the UE on the first wireless system, (xi) channel quality of the UE for the first and/or second wireless system, and/or (xii) other factors. The network entity may determine the priority of each UE based on a function of at least one factor.

In one design, the network entity may determine priorities of the plurality of UEs for switching based on a set of factors that may be arranged in a predetermined order of importance. The network entity may determine the priorities of the plurality of UEs for switching by considering one factor in the set of factors at a time, starting with a factor of a highest importance, e.g., until the priorities of the plurality of UEs are unique. The network entity may then select at least one UE to switch based on the priorities of the plurality of UEs. In another design, the network entity may determine the priorities of the plurality of UEs for switching based on a function of all factors or a group of factors being considered.

In one design, the plurality of wireless systems may include a WLAN system and a cellular system. In other designs, the plurality of wireless systems may include wireless systems of other types and/or other radio technologies.

In one design, the plurality of wireless systems may include the first and second wireless systems and may be part of a small cell. In this design, UEs may be switched between wireless systems in the small cell. In another design, the plurality of wireless systems may include the first wireless system in a small cell but may exclude the second wireless system. In this design, UEs may be switched between the first wireless system in the small cell and an external wireless system outside the small cell. For both designs, the small cell may be designated to perform at least one function for the plurality of wireless systems. The network entity may be part of the small cell or a small cell controller, which may perform blocks 212, 214 and 216 in FIG. 2.

FIG. 3 shows a design of a process 300 for communication. Process 300 may be performed by a UE (as described below) or by some other entity. The UE may communicate with a first wireless system among a plurality of wireless systems (block 312). The first wireless system may experience or anticipate congestion. The UE may receive signaling to switch the UE from the first wireless system to a second wireless system (block 314). The UE may be one of a plurality of UEs considered for switching from the first wireless system to the second wireless system. The UE may be assigned a priority for switching from the first wireless system to the second wireless system based one or more factors described above. The UE may thereafter communicate with the second wireless system after receiving the signaling to switch to the second wireless system (block 316).

Figure 4:
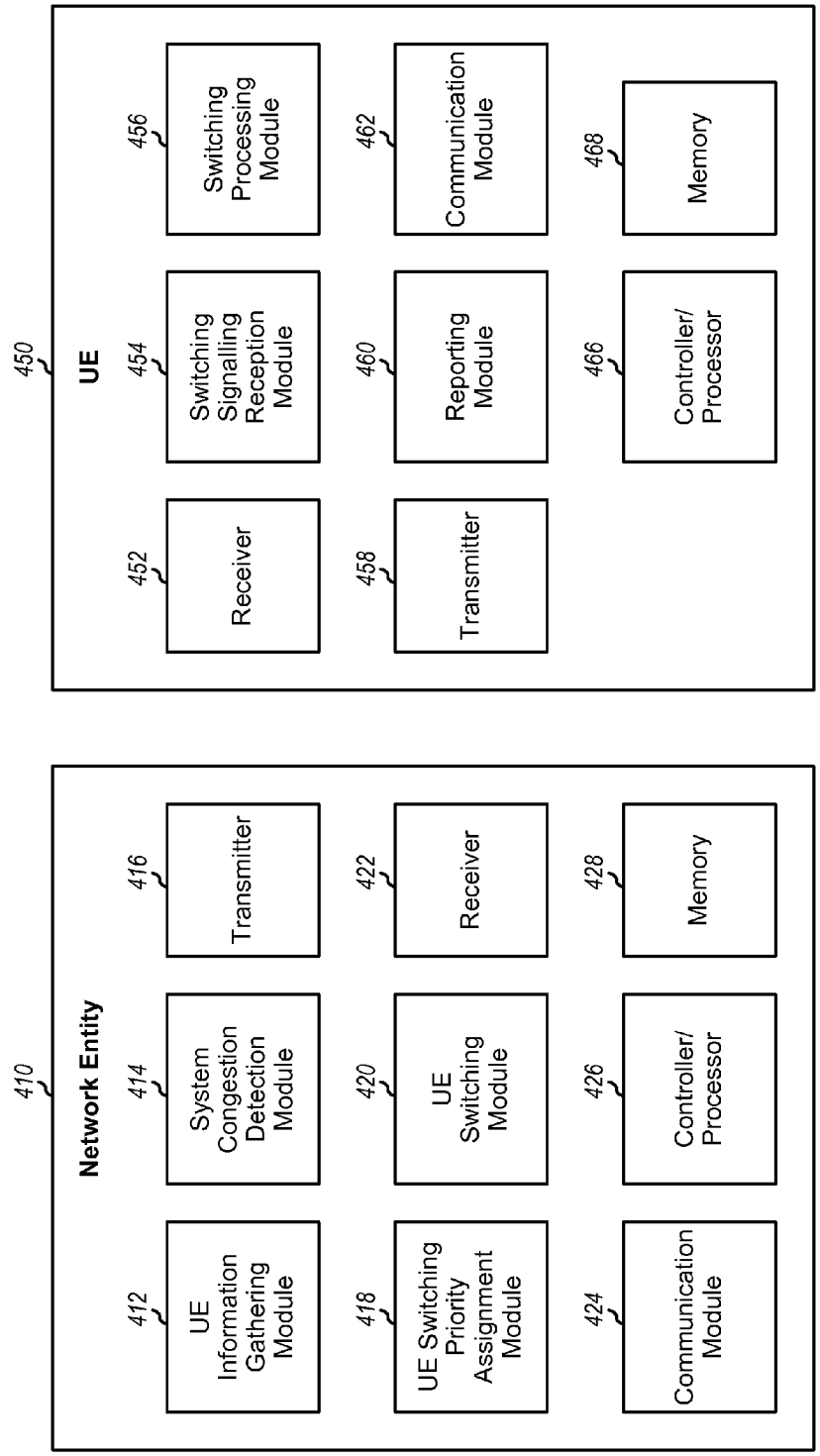
FIG. 4 shows a block diagram of a network entity and a UE.

FIG. 4 shows a block diagram of a design of a network entity 410 and a UE 450. Network entity 410 may be responsible for switching UEs between wireless systems. Network entity 410 may correspond to switching manager 142 or small cell controller 140 in FIG. 1 or some other network entity. Network entity 410 may directly communicate with UE 450 or may communicate with UE 450 via one or more other entities. UE 450 may correspond to any of UEs 110 to 116 in FIG. 1.

At network entity 410, a module 412 may gather information for UEs communicating with a plurality of wireless systems, e.g., a WLAN system and a cellular system in a small cell. The gathered information may be related to any of the factors described above and may be used to assigned priorities to the UEs for switching between wireless systems. A module 414 may detect congestion in different wireless systems. A module 418 may assign priorities to UEs for switching between wireless systems based on the gathered information. A module 420 may select one or more UEs for switching between wireless systems, e.g., from a congested wireless system to an uncongested wireless system based on the priorities of the UEs. A module 424 may support communication with UEs and/or other network entities. A transmitter 416 may generate and send signals comprising control information such as switching decisions for UEs. A receiver 422 may receive and process signals sent by UEs and/or other network entities. The various modules within network entity 410 may operate as described above. A controller/processor 426 may direct the operation of various modules within network entity 410. A memory 428 may store data and program codes for network entity 410.

At UE 450, a module 454 may receive signaling indicating switching of UE 450 to a new system. A module 456 may perform processing (e.g., connection setup, session configuration, etc.) to switch UE 450 to the new system. A module 460 may report information related to one or more factors that may be considered in determining a priority of UE 450 for switching between wireless systems. A module 462 may support communication with base stations and/or other network entities. A receiver 452 may receive and process downlink signals sent by base stations and/or other network entities. A transmitter 458 may generate and send uplink signals comprising information sent by UE 450. The various modules within UE 450 may operate as described above. A controller/processor 466 may direct the operation of various modules within base station 110x. A memory 468 may store data and program codes for UE 450.

The modules in FIG. 4 may comprise processors, electronic devices, hardware devices, electronic components, logical circuits, memories, software codes, firmware codes, etc., or any combination thereof.

Figure 5:
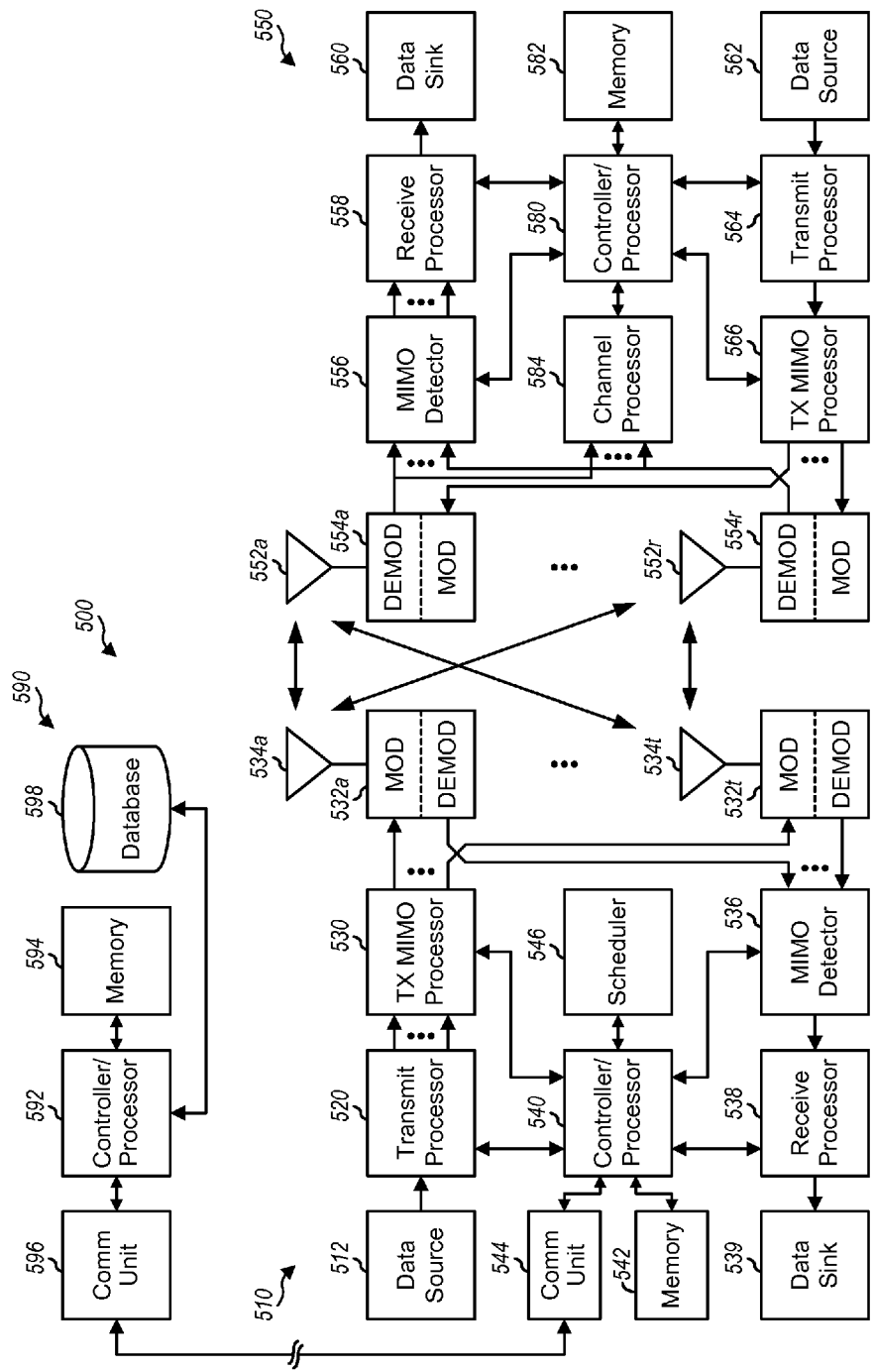
FIG. 5 shows a block diagram of a small cell and a UE.

FIG. 5 shows a block diagram of a small cell 500 and a UE 550. UE 550 may correspond to any of UEs 110 to 116 in FIG. 1. Small cell 800 may be one design of small cell 120 in FIG. 1 and may include a base station 810 and a small cell controller 890. Small cell controller 890 may correspond to small cell controller 140 in FIG. 1. Base station 510 may correspond to access point 122 or femto cell 124 in FIG. 1. Base station 510 may be equipped with T antennas 534a through 534t, and UE 550 may be equipped with R antennas 552a through 552r, where in general T≥1 and R≥1.

At base station 510, a transmit processor 520 may receive data from a data source 512 and control information (e.g., messages) from a controller/processor 540. Processor 520 may process (e.g., encode and modulate) the data and control information to obtain data symbols and control symbols, respectively. Processor 520 may also generate reference symbols for synchronization signals, reference signals, etc. A transmit (TX) multiple-input multiple-output (MIMO) processor 530 may perform spatial processing (e.g., precoding) on the data symbols, the control symbols, and/or the reference symbols, if applicable, and may provide T output symbol streams to T modulators (MODs) 532a through 532t. Each modulator 532 may process a respective output symbol stream (e.g., for OFDM, SC-FDMA, CDMA, etc.) to obtain an output sample stream. Each modulator 532 may further process (e.g., convert to analog, amplify, filter, and upconvert) the output sample stream to obtain a downlink signal. T downlink signals from modulators 532a through 532t may be transmitted via T antennas 534a through 534t, respectively.

At UE 550, antennas 552a through 552r may receive the downlink signals from base station 510 and other base stations. Antennas 552a through 552r may provide received signals to demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for SC-FDMA, OFDMA, CDMA, etc.) to obtain received symbols. A MIMO detector 556 may obtain received symbols from all R demodulators 554a through 554r, perform MIMO detection on the received symbols if applicable, and provide detected symbols. A receive processor 558 may process (e.g., demodulate and decode) the detected symbols, provide decoded data for UE 550 to a data sink 560, and provide decoded control information to a controller/processor 580. A channel processor 584 at UE 550 may receive downlink signals from base station 510 and/or other base stations. Processor 580 may determine channel quality for base station 510 and/or other base stations based on the received downlink signals.

On the uplink, at UE 550, a transmit processor 564 may receive data from a data source 562 and control information (e.g., messages) from controller/processor 580. Processor 564 may process (e.g., encode and modulate) the data and control information to obtain data symbols and control symbols, respectively. Processor 564 may also generate reference symbols for reference signals. The symbols from transmit processor 564 may be precoded by a TX MIMO processor 566 if applicable, further processed by modulators 554a through 554r (e.g., for OFDMA, SC-FDMA, CDMA, etc.), and transmitted to base station 510 and other base stations. At base station 510, the uplink signals from UE 550 and other UEs may be received by antennas 534, processed by demodulators 532, detected by a MIMO detector 536 if applicable, and further processed by a receive processor 538 to obtain decoded data and control information sent by UE 550 and other UEs. Processor 538 may provide the decoded data to a data sink 539 and the decoded control information to controller/processor 540.

Controllers/processors 540 and 580 may direct the operation at base station 510 and UE 550, respectively. Processor 580 and/or other processors and modules at UE 550 may perform or direct process 300 in FIG. 3 and/or other processes for the techniques described herein. Processor 540 and/or other processors and modules at base station 510 may perform or direct process 200 in FIG. 2 and/or other processes for the techniques described herein. Memories 542 and 582 may store data and program codes for base station 510 and UE 550, respectively. A communication (Comm) unit 544 may enable base station 510 to communicate with other network entities. A scheduler 546 may schedule UEs for communication and may assign resources to the scheduled UEs.

Within small cell controller 590, a controller/processor 592 may perform various functions to support communication for UEs. Processor 592 and/or other processors and modules at small cell controller 590 may perform or direct process 200 in FIG. 2 and/or other processes for the techniques described herein. A memory 594 may store program codes and data for small cell controller 590. A storage unit 594 may store information for UEs and/or wireless systems within the control of small cell controller 590. A communication unit 596 may enable small cell controller 590 to communicate with other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   identifying a plurality of user equipments (UEs) communicating with a first wireless system, the first wireless system being one of a plurality of wireless systems providing communication coverage for the plurality of UEs;
   determining priorities of the plurality of UEs for switching from the first wireless system to a second wireless system; and
   selecting at least one UE among the plurality of UEs to switch from the first wireless system to the second wireless system based on the priorities of the plurality of UEs,
   wherein the plurality of wireless systems is part of a small cell designated to perform at least one control function for the plurality of wireless systems, and wherein the identifying the plurality of UEs, the determining priorities of the plurality of UEs for switching, and the selecting the at least one UE to switch are performed by the small cell.

2. The method of claim 1, wherein the determining priorities of the plurality of UEs for switching comprises determining a priority of each UE of the plurality of UEs for switching from the first wireless system to the second wireless system based on whether said each UE can receive service on the second wireless system.

3. The method of claim 1, wherein the determining priorities of the plurality of UEs for switching comprises determining a priority of each UE of the plurality of UEs for switching from the first wireless system to the second wireless system based on whether said each UE has an active application that is supported on only the first wireless system.

4. The method of claim 1, wherein the determining priorities of the plurality of UEs for switching comprises determining a priority of each UE of the plurality of UEs for switching from the first wireless system to the second wireless system based on an amount of resources of the first wireless system utilized by said each UE.

5. The method of claim 1, wherein the determining priorities of the plurality of UEs for switching comprises determining a priority of each UE of the plurality of UEs for switching from the first wireless system to the second wireless system based on a transmit buffer size, or a receive buffer size, or both the transmit buffer size and the receive buffer size of said each UE.

6. The method of claim 1, wherein the determining priorities of the plurality of UEs for switching comprises determining a priority of each UE of the plurality of UEs for switching from the first wireless system to the second wireless system based on whether said each UE has an active real-time application.

7. The method of claim 1, wherein the determining priorities of the plurality of UEs for switching comprises determining a priority of each UE of the plurality of UEs for switching from the first wireless system to the second wireless system based on service charge to said each UE for the first wireless system, or the second wireless system, or both.

8. The method of claim 1, wherein the determining priorities of the plurality of UEs for switching comprises determining a priority of each UE of the plurality of UEs for switching from the first wireless system to the second wireless system based on capability of said each UE on the first wireless system.

9. The method of claim 1, wherein the determining priorities of the plurality of UEs for switching comprises determining a priority of each UE of the plurality of UEs for switching from the first wireless system to the second wireless system based on capability of said each UE on the second wireless system.

10. The method of claim 1, wherein the determining priorities of the plurality of UEs for switching comprises determining a priority of each UE of the plurality of UEs for switching from the first wireless system to the second wireless system based on whether said each UE has traffic on downlink, or uplink, or both downlink and uplink.

11. The method of claim 1, wherein the determining priorities of the plurality of UEs for switching comprises determining a priority of each UE of the plurality of UEs for switching from the first wireless system to the second wireless system based on data requirements of said each UE, or data performance of said each UE on the first wireless system, or channel quality of said each UE for the first or second wireless system, or a combination thereof.

12. The method of claim 1, wherein the determining priorities of the plurality of UEs for switching comprises determining a priority of each UE of the plurality of UEs for switching from the first wireless system to the second wireless system based on a function of at least one factor.

13. The method of claim 1, further comprising:
   determining a set of factors arranged based on an order of importance;
   determining the priorities of the plurality of UEs for switching by considering one factor in the set of factors at a time, starting with a factor in the set of factors of a highest importance, until the priorities of the plurality of UEs are unique; and
   selecting at least one UE to switch based on the priorities of the plurality of UEs.

14. The method of claim 1, wherein the plurality of wireless systems comprises a wireless local area network (WLAN) system and a cellular system.

15. The method of claim 1, wherein the plurality of wireless systems includes the first and second wireless systems.

16. The method of claim 1, wherein the plurality of wireless systems includes the first wireless system, and wherein the second wireless system is external to the small cell.

17. A small cell designated to perform at least one control function for a plurality of wireless systems, comprising:
at least one processor configured to:
identify a plurality of user equipments (UEs) communicating with a first wireless system, the first wireless system being one of the plurality of wireless systems providing communication coverage for the plurality of UEs;
determine priorities of the plurality of UEs for switching from the first wireless system to a second wireless system of the plurality of wireless systems; and
select at least one UE among the plurality of UEs to switch from the first wireless system to the second wireless system based on the priorities of the plurality of UEs.

18. The small cell of claim 17, wherein the at least one processor is configured to determine a priority of each UE of the plurality of UEs for switching from the first wireless system to the second wireless system based on a function of at least one factor.

19. The small cell of claim 17, wherein the at least one processor is configured to evaluate at least one factor, one factor at a time, to determine the priorities of the plurality of UEs for switching and to select the at least one UE to switch from the first wireless system to the second wireless system.

20. A small cell designated to perform at least one control function for a plurality of wireless systems, comprising:
means for identifying a plurality of user equipments (UEs) communicating with a first wireless system, the first wireless system being one of the plurality of wireless systems providing communication coverage for the plurality of UEs;
means for determining priorities of the plurality of UEs for switching from the first wireless system to a second wireless system of the plurality of wireless systems; and
means for selecting at least one UE among the plurality of UEs to switch from the first wireless system to the second wireless system based on the priorities of the plurality of UEs.

21. The small cell of claim 20, wherein the means for determining priorities of the plurality of UEs for switching comprises means for determining a priority of each UE of the plurality of UEs for switching from the first wireless system to the second wireless system based on a function of at least one factor.

22. The small cell of claim 20, wherein the means for determining priorities of the plurality of UEs for switching comprises means for evaluating at least one factor, one factor at a time, to determine the priorities of the plurality of UEs for switching from the first wireless system to the second wireless system.

23. A non-transitory computer-readable medium comprising:
code for causing at least one processor to identify a plurality of user equipments (UEs) communicating with a first wireless system, the first wireless system being one of a plurality of wireless systems forming part of a small cell designated to perform at least one control function for the plurality of wireless systems and providing communication coverage for the plurality of UEs;
code for causing the at least one processor to determine priorities of the plurality of UEs for switching from the first wireless system to a second wireless system of the plurality of wireless systems; and
code for causing the at least one processor to select at least one UE among the plurality of UEs to switch from the first wireless system to the second wireless system based on the priorities of the plurality of UEs.

24. A method for wireless communication, comprising:
communicating with a first wireless system among a plurality of wireless systems, forming part of a small cell designated to perform at least one control function for the plurality of wireless systems, by a user equipment (UE);
receiving signaling to switch the UE from the first wireless system to a second wireless system of the plurality of wireless systems, the UE being one of a plurality of UEs considered for switching from the first wireless system to the second wireless system and being assigned a priority for switching from the first wireless system to the second wireless system; and
communicating with the second wireless system by the UE after receiving the signaling to switch to the second wireless system.

25. The method of claim 24, wherein the UE is assigned the priority for switching based on at least one of whether the UE can receive service on the second wireless system, whether the UE has an active application supported on only the first wireless system, an amount of resources of the first wireless system utilized by the UE, a transmit buffer size of the UE, a receive buffer size of the UE, whether the UE has an active real-time application, service charge to the UE on the first or second wireless system, capability of the UE on the second wireless system, whether the UE has traffic on downlink or uplink or both, amount of traffic for the UE in each of the downlink and uplink, data requirements of the UE, data performance of the UE on the first wireless system, or channel conditions observed by the UE for the first or second wireless system.

26. An apparatus for wireless communication, comprising:
at least one processor configured to:
communicate with a first wireless system among a plurality of wireless systems, forming part of a small cell designated to perform at least one control function for the plurality of wireless systems, by a user equipment (UE);
receive signaling to switch the UE from the first wireless system to a second wireless system of the plurality of wireless systems, the UE being one of a plurality of UEs considered for switching from the first wireless system to the second wireless system and being assigned a priority for switching from the first wireless system to the second wireless system; and
communicate with the second wireless system by the UE after receiving the signaling to switch to the second wireless system.

27. The apparatus of claim 26, wherein the UE is assigned the priority for switching based on at least one of whether the UE can receive service on the second wireless system, whether the UE has an active application supported on only the first wireless system, an amount of resources of the first wireless system utilized by the UE, a transmit buffer size of the UE, a receive buffer size of the UE, whether the UE has an active real-time application, service charge to the UE on the first or second wireless system, capability of the UE on the second wireless system, whether the UE has traffic on downlink or uplink or both, amount of traffic for the UE in each of the downlink and uplink, data requirements of the UE, data performance of the UE on the first wireless system, or channel conditions observed by the UE for the first or second wireless system.

28. An apparatus for wireless communication, comprising:
means for communicating with a first wireless system among a plurality of wireless systems, forming part of a small cell designated to perform at least one control function for the plurality of wireless systems, by a user equipment (UE);
means for receiving signaling to switch the UE from the first wireless system to a second wireless system of the plurality of wireless systems, the UE being one of a plurality of UEs considered for switching from the first wireless system to the second wireless system and being assigned a priority for switching from the first wireless system to the second wireless system; and
means for communicating with the second wireless system by the UE after receiving the signaling to switch to the second wireless system.

29. The apparatus of claim 28, wherein the UE is assigned the priority for switching based on at least one of whether the UE can receive service on the second wireless system, whether the UE has an active application supported on only the first wireless system, an amount of resources of the first wireless system utilized by the UE, transmit buffer size of the UE, receive buffer size of the UE, whether the UE has an active real-time application, service charge to the UE on the first or second wireless system, capability of the UE on the second wireless system, whether the UE has traffic on downlink or uplink or both, amount of traffic for the UE in each of the downlink and uplink, data requirements of the UE, data performance of the UE on the first wireless system, or channel conditions for the first or second wireless system.

30. A non-transitory computer-readable medium comprising:
code for causing at least one processor to communicate with a first wireless system among a plurality of wireless systems, forming part of a small cell designated to perform at least one control function for the plurality of wireless systems, by a user equipment (UE);
code for causing the at least one processor to receive signaling to switch the UE from the first wireless system to a second wireless system of the plurality of wireless systems, the UE being one of a plurality of UEs considered for switching from the first wireless system to the second wireless system and being assigned a priority for switching from the first wireless system to the second wireless system; and
code for causing the at least one processor to communicate with the second wireless system by the UE after receiving the signaling to switch to the second wireless system.

31. A method for wireless communication, comprising:
identifying a plurality of user equipments (UEs) communicating with a first wireless system within a communication coverage area served by the first wireless system and at least a second wireless system;
determining a respective priority for each of two or more UEs of the plurality of UEs for switching from the first wireless system to the second wireless system, wherein the respective priority for a UE of the two or more UEs is determined differently for switching the UE from the first wireless system to the second wireless system than for switching the UE from the second wireless system to the first wireless system; and
selecting at least one UE of the two or more UEs to switch from the first wireless system to the second wireless system based on the respective priorities of the two or more UEs.

32. A method for wireless communication, comprising:
identifying a plurality of user equipments (UEs) communicating with a first wireless system, the first wireless system being one of a plurality of wireless systems providing communication coverage for the plurality of UEs;
determining a respective priority for each of two or more UEs of the plurality of UEs for switching from the first wireless system to a second wireless system, wherein the respective priority for each UE of the two or more UEs is determined using one or more factors applicable to switching the UE from the first wireless system to the second wireless system which is not applicable to switching the UE from the second wireless system to the first wireless system; and
selecting at least one UE among the plurality of UEs to switch from the first wireless system to the second wireless system based on the priorities of the plurality of UEs.

* * * * *